Dec. 1, 1959        J. B. ARMITAGE ET AL        2,914,992
MACHINE TOOL TRANSMISSION AND CONTROL MECHANISM
Original Filed Dec. 21, 1946                    6 Sheets-Sheet 1

Joseph B. Armitage, &
Theodore J. Eserkoln
INVENTORS

Joseph B. Armitage &
Theodore F. Eserkaln
INVENTORS.

BY
ATTORNEY

Dec. 1, 1959   J. B. ARMITAGE ET AL   2,914,992
MACHINE TOOL TRANSMISSION AND CONTROL MECHANISM
Original Filed Dec. 21, 1946   6 Sheets-Sheet 4

FIG. 6

INVENTORS
Joseph B. Armitage
Theodore F. Eserkaln
BY
ATTORNEY

United States Patent Office 2,914,992
Patented Dec. 1, 1959

2,914,992

MACHINE TOOL TRANSMISSION AND CONTROL MECHANISM

Joseph B. Armitage and Theodore F. Eserkaln, Wauwatosa, Wis., assignors to Kearney & Trecker Corporation, West Allis, Wis., a corporation of Wisconsin Original application December 21, 1946, Serial No. 717,712, now Patent No. 2,653,519, dated September 29, 1953. Divided and this application August 26, 1953, Serial No. 376,570

4 Claims. (Cl. 90—21)

This invention relates generally to machine tools and more particularly to machine tool transmission and control mechanism.

This application is a division of application Serial No. 717,712, filed December 21, 1946, entitled "Machine Tool Transmissions and Control Mechanism," which issued on September 29, 1953, as Patent No. 2,653,519.

A general object of the invention is to provide an improved machine tool transmission mechanism, together with an improved control mechanism to provide selective operation thereof.

Another object of the invention is to provide separate motor drives for various machine tool elements with coordinated cyclic control of the motors.

Another object of the invention is to provide an improved automatic cyclic control system for a machine tool.

Another object of the invention is to provide an improved electrical control system for a milling machine.

Another object of the invention is to provide a machine tool drive mechanism incorporating differential gearing selectively driven from a plurality of motors.

Another object of the invention is to provide an improved drum type switch manually or automatically operable in a control circuit to effect predetermined speed and directional control of a machine tool element.

Another object of the invention is to provide an improved dog-actuated tripping mechanism for actuating a control system to effect a predetermined operating cycle.

Still another object of the invention is to provide an electrical control circuit for a machine tool including a plurality of solenoid actuated shifting mechanisms.

According to this invention, an improved milling machine is provided having an automatic electrical control system. The movable elements of the machine are selectively driven by a differential mechanism at a plurality of feed rates or at a rapid traverse rate. Separate motors are connected to the differential one for the feed drive and one for the rapid traverse drive. A variation in the feed rate is effected mechanically through a pick-off gear transmission. A predetermined operating cycle for the two power drives may be selected by positioning a series of trip-dogs relative to dog-actuated control plungers operably mounted in a drum control switch. A single control lever operably carried on the front of the machine affords manually controlled directional and feed-rapid traverse drive operation. A modification of the control circuit is provided wherein a multiple position manually or automatically operable drum switch is also used to energize the motors. The switch, likewise, is automatically set by a plurality of trip-dogs predeterminately positioned on the movable element of the machine relative to a single dog-actuated control plunger.

The foregoing and other objects of this invention, which will become more fully apparent from the following detailed description of an embodiment thereof, may be achieved by the apparatus herein described by way of example in connecting with the illustration in the accompanying drawings, in which.

Figure 1:
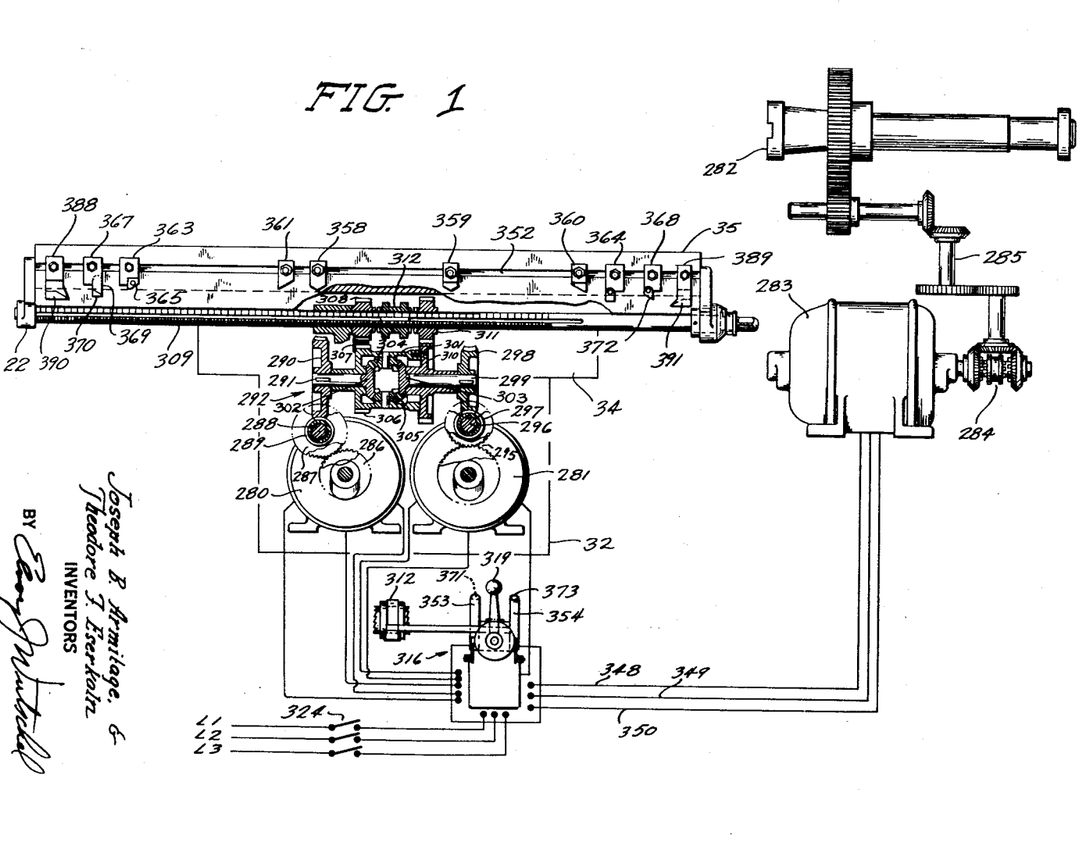
Figure 1 is a schematic diagram of a machine tool drive system incorporating two feed drive motors.

Referring to the drawings, the invention is schematically shown in Fig. 1. In this case, separate motors are used for the rapid traverse and feed drives of a movable machine tool member. An electrical control system which is manually operable by the machine operator or automatically operable through engagement with a series of trip-dogs carried on the movable member, readily permits a greater versatility in machine tool control than has heretofore been possible in the conventional type machine. In the particular instance, the invention is shown incorporated in a knee type milling machine, wherein the table 35 is mounted for longitudinal movement on the saddle 34, which in turn, is slidably mounted for transverse movement on the knee 32. While the power drive is shown to drive the table 35, it would be possible to operate any machine tool member, or plurality of members, in a similar manner.

The power driven mechanism for the movable machine tool element is a self-contained unit carried in the movable knee 32 of the milling machine. A feed drive motor 280 and a rapid traverse drive motor 281 are mounted within the knee 32 to provide a selective feed drive and rapid traverse drive to the table 35. A tool retaining spindle 282 rotatably mounted in the column of the machine in a well known manner, is driven by a spindle drive motor 283 through a reversing mechanism 284 and a variable speed transmission 285. The operation of the three motors is electrically coordinated in a manner to be hereinafter more fully described.

The feed motor 280 is disposed to drive a pair of pick-off gears 286 and 287, constituting a pick-off gear transmission conveniently contained in the front of the knee 32 for ready accessability. A plurality of feed rates for the table 35 is provided by interchanging the pick-off gears within the transmission in a well known manner. The gear 287 is splined to a shaft 288 which is journalled within the knee 32. A worm 289 is keyed to the shaft 288 and is disposed to mesh with a worm wheel 290 carried on the end of a differential gear shaft 291, constituting part of a differential element 292 operably mounted in the saddle 34 of the milling machine. The differential 292 is also driven from the rapid traverse motor 281. Since the rapid traverse rate provided for the table 35 is constant, a permanent gear train 295 is provided from the motor 281 to a shaft 296 journalled in the knee 32. The shaft 296 is keyed to drive a worm 297 mounted thereon and a worm wheel 298 meshing therewith. The worm wheel 298, in turn, is keyed to a differential shaft 299, likewise constituting a part of the differential 292.

Both of the differential shafts 291 and 299 are journalled within a differential carrier 301. A bevel gear 302 is integrally formed on the inner end of the differential shaft 291, while a bevel gear 303 is formed on the inner end of the shaft 299. Both of the gears 302 and 303 mesh with spider gears 304 and 305 rotatably mounted in the differential carrier 301. The differential 292 is disposed to be driven from either the feed motor 280 or from the rapid traverse motor 281 selectively, with the electric control being arranged to energize either one or the other of the two motors at a given instant.

The leftwardly drive train from the differential 292 is constituted by a ring gear 306 attached to the periphery of the differential carrier 301. The gear 306 constantly meshes with an idler gear 307, which, in turn, meshes with a gear 308 rotatably mounted on a table screw shaft 309. The rightwardly drive train from the differential 292 is constituted by a ring gear 310 fixedly carried on the carrier 301 and which meshes with a gear 311 rotatably carried on the table screw shaft 309. The power drive from the gear 308 or from the gear 311, may be selectively completed to the table screw shaft 309 through a clutch mechanism 312. The clutch mechanism 312 is of a well known type, whereby axial positioning of a clutch collar therein to one of three positions, serves to selectively complete or disconnect the drive trains. Thus, when the clutch 312 is shifted leftwardly, the gear 308 is connected to drive the screw shaft 309 at feed or rapid traverse rate to effect leftward table movement, and when the clutch 312 is shifted rightwardly, the gear 311 is connected to drive the screw shaft 309 at feed or rapid traverse rate to effect rightward table movement. If the clutch is positioned intermediately of the two gears, the gear drives are disconnected to interrupt the power drive to the table 35. The advantage of the aforedescribed driving mechanism lies in the fact that it is extremely compact with a minimum of operating parts.

The main advantage gained from this arrangement is that an electric control system can be employed to coordinate the energization of the motors to provide a precise cycle of operation for the machine tool table 35 for high speed production work. Because of the degree of precision possible in setting up cyclic movements of a machine tool table for a particular machining operation, the length of the entire operating cycle is reduced considerably to lower production costs.

Figure 5:
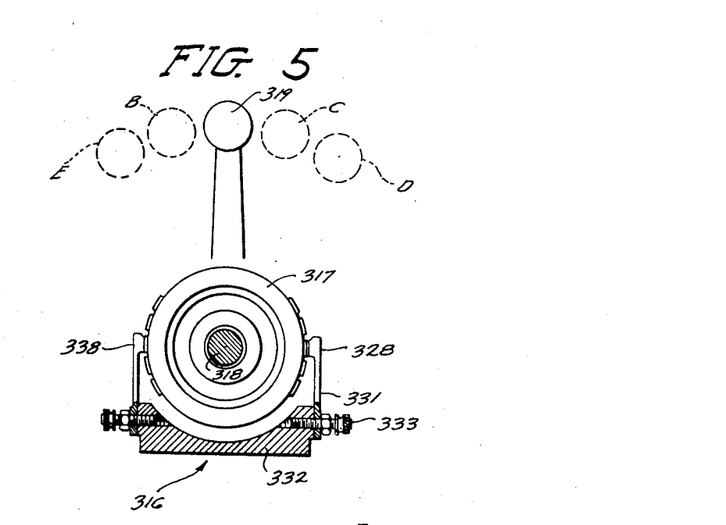
Fig. 5 is an enlarged view of the control drum switch shown in Fig. 1 with the various positions of the switch indicated by dotted lines.

Automatic or manual control of the motors is effected through the operation of a control unit 316 mounted on the saddle of the machine. The power drive control of the movable table 35 is effected from this single control unit. Manual or automatic control of the movements of the table 35 at either feed or rapid traverse rates in either direction may be effected from the single control station 316. The control unit 316 comprises essentially a rotatable contact drum 317, Fig. 2, keyed to a shaft 318 appropriately journalled and having a control lever 319 attached to its outer end. Manual control of the table operation is afforded by manipulating the control handle 319 to one of five positions. The handle 319 is shown in Figs. 1 and 5 in the vertical neutral position. Movement of the handle to the right from the vertical position serves to effect rightward movement of the table, while movement to the left of the neutral position serves to effect leftwardly movement of the table at feed or rapid traverse rates selectively, as will be hereinafter more fully described.

Figure 2:
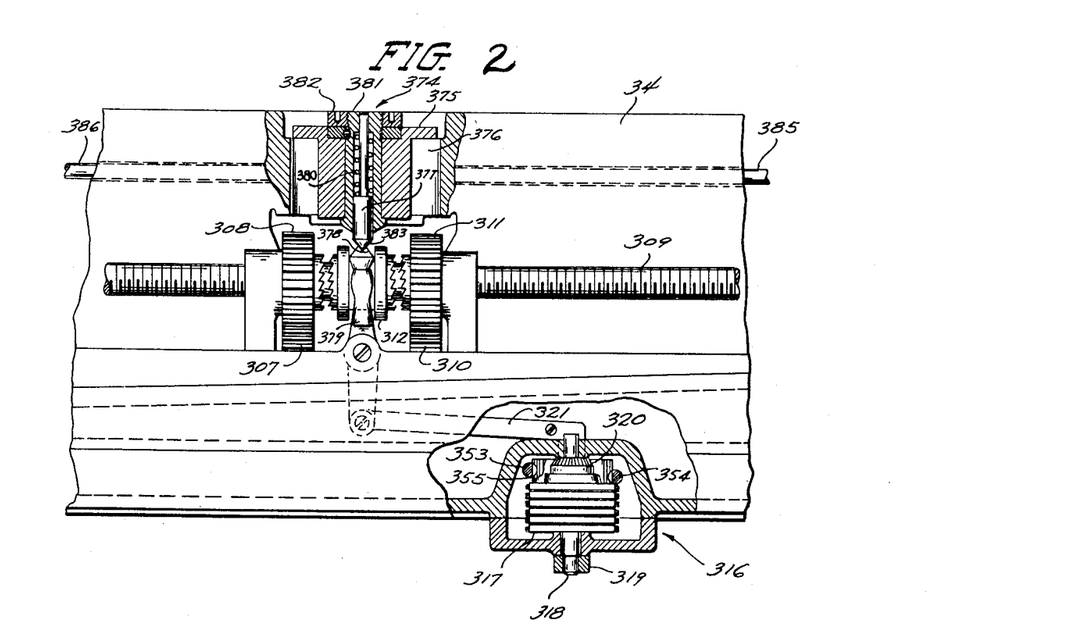
Fig. 2 is a horizontal view partly in section through the saddle, showing the table screw drive mechanism and the control mechanism for operating the clutch and driving motors.

The rotation of the shaft 318 serves to rotate a gear segment 320 attached to the inner end thereof, as shown in Fig. 2. The gear segment is connected to a linkage mechanism 321 connecting with the reversing clutch mechanism 312, whereby movement of the control handle 319 to the left serves to shift the clutch 312 to the left into engagement with the gear 308 and to provide a power connection for driving the table 35 leftwardly. Movement of the handle 319 to the right serves to effect a rightwardly movement of the clutch 312 by means of the linkage mechanism 321, whereby the clutch is brought into engagement with the gear 311 to provide a power drive train for driving the table 35 rightwardly.

Figure 4:
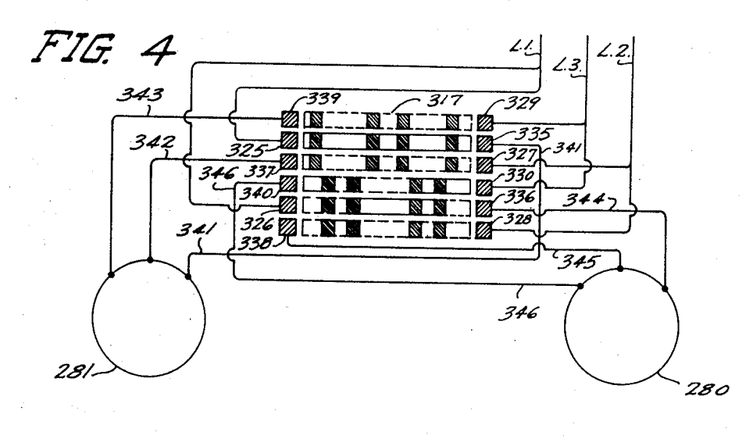
Fig. 4 is a diagrammatic showing of the electrical connections from the motors to the control drum switch.

The contact drum 317 in the electric control unit 316 is disposed to complete an electric circuit to either of the two drive motors 280 and 281. The drum is constructed of a nonconducting material and is provided with a plurality of contacting strips variously disposed to provide a series of conductors on the peripheral surface of the drum, as shown in Fig. 4. The development of the contact strips is indicated in the drawing to clearly show the means of conducting the electrical current from supply lines $L_1$, $L_2$ and $L_3$ to the motors. When the master switch 324 shown in Fig. 1 is closed, the supply line current will flow to six flexible contact arms. Thus, the current from line $L_1$ will flow to contact arms 325 and 326, while current from supply line $L_2$ will flow to contact arms 327 and 328 and current from supply line $L_3$ will be directed to contact arms 329 and 330, as shown in Fig. 4. Each of the supply line contact arms is disposed to ride on one of six annular contact surfaces on the drum 317. A mating contact arm for each of the six supply line arms is likewise disposed to engage its respective contact surface on the drum 317. As shown in Fig. 5, the second set of contact arms is disposed to engage the drum 317 at a point directly opposite the point of engagement of the supply line contact arms. Each of the contact arms is constituted by a flexible strip 331 mounted on a non-conducting terminal block 332 by means of a terminal post 333. Sufficient tension is placed on each of the contact arms to cause the contact to engage its respective contact surface on the drum 317.

As shown in Fig. 4, the supply line contacts 325, 326, 327, 328, 329 and 330 are each disposed to provide a current supply to one of the motor contact arms 335, 336, 337, 338, 339 and 340, respectively. The motor contact arms 335, 337 and 339 are connected to conductors 341, 342 and 343, respectively, which serve to carry current to the rapid traverse motor 281. The motor contacts 336, 338 and 340 are connected to conductors 344, 345 and 346, respectively, which serve to conduct current to the feed motor 280. The control unit 316 also provides a circuit to spindle motor conductors 348, 349 and 350, which serve to energize the spindle motor 283 whenever the feed motor 280 is energized, as indicated in Fig. 1. With this arrangement, it is impossible to feed a workpiece mounted on the table 35 into a non-rotating cutter at feed rate, since the cutter spindle 282 will always be driven when the feed motor 280 is operating to drive the table 35.

With the arrangement of contact surfaces on drum 317 indicated in Fig. 4, it is possible to complete a motor circuit when the drum is rotated to any one of four positions. Thus, when the control handle 319 is moved from the neutral position to position B shown in Fig. 5, a motor circuit to the feed motor 280 will be completed via contacts 326, 328, 330, 336, 338 and 340. At the same time, the movement of the handle 319 will effect a positioning of the clutch mechanism 312 to provide leftwardly movement of the table. Thus, the table 35 will be power driven at feed rate to the left. If the handle 319 is moved to position C, a second set of peripheral conductors on the surface of the control drum 317 will likewise complete a circuit to the feed motor 280, but the movement will serve to shift the clutch mechanism 312 rightwardly into engagement with the gear 311, whereby rightwardly movement of the table will be provided at feed rate.

The rapid traverse motor 281 may be energized to drive the table 35 in either direction at rapid traverse rate, by shifting the control handle 319 to either position D or E, as indicated in Fig. 5. When the handle is shifted to position D, the rapid traverse motor 281 is energized via contact arms 325, 327, 329, 335, 337 and 339, and the clutch mechanism 312 will be positioned to provide rightwardly movement of the table at rapid traverse rate. If the table 35 is to be driven leftwardly at rapid traverse rate, the handle 319 must be shifted to position E, whereat a second set of drum contacts will likewise serve to complete a circuit to the rapid traverse motor 281, but the clutch mechanism 312 will have been shifted to effect leftward movement of the table. Thus, it is evident that the complete manual control of the table movement is possible merely by shifting the handle 319 to one of five positions.

The movable table 35 may also be operated automatically to perform a predetermined operating cycle as required for a particular milling operation. The control unit 316 is then mechanically shifted by means of a series of trip-dogs carried in a T-slot 352 on the front face of the movable table, as shown in Fig. 1. At various points of table travel, the trip-dogs are interposed to operate the control unit in a manner similar to that aforedescribed for manual control.

The mechanism for operating the control unit 316 consists of a pair of vertically disposed plunger rods 353 and 354, shown in Figs. 1 and 2, slidably mounted in the saddle 34 for axial movement and operative upon a spur gear 355 fastened to the inner end of the contact drum 317. Rack teeth on each of the plungers 353 and 354 are designed to mesh with the teeth on the gear 355 when axial pressure is imparted to either of the plungers. The drum may be rotated in a clockwise or counterclockwise direction depending upon the point of pressure application upon the rods. The upper end of each of the plungers is tapered to permit ease of engagement with the trip-dogs. When both of the plungers are positioned to place their respective upper ends in an even plane, the control handle 319 in the control unit 316 will be in a neutral position and feed or rapid traverse power movement in either direction will not be possible. At this time, the table 35 can be manually operated by attaching a crank to the squared right end of the table screw 309 and rotating it in a well known manner. With the plungers in the neutral position, all of the trip-dogs carried in the T-slot 352 will be rendered ineffective, since they will not engage the plungers.

If an automatic operating cycle is required, the operator must predeterminately adjust a series of trip-dogs mounted on the table 35 in a well known manner. As shown in Fig. 1, a dog 358 serves to engage the end of plunger 353 and force it downwardly to the neutral position to stop any rightward movement of the table at feed rate. A second stop dog 359 serves to operate in a like manner upon the plunger rod 354 to halt leftward movement of the table at feed rate. Feeding movement of the table will consequently stop whenever the dogs 358 or 359 engage the plungers 353 or 354, respectively, regardless of whether or not the feeding movement was initially instituted by the manual manipulation of the control lever 319 or automatically by one or the other trip-dogs. Leftward movement of the table 35 at rapid traverse rate may be stopped by a rapid traverse stop dog 360. When the control element 316 is set to effect leftward movement of the table, the automatic plunger 354 is in a raised position while the plunger 353 is retained in a lowered position. At some predetermined point of travel, the dog 360 will engage the beveled tip of the plunger 354 and depress it sufficiently to return the control lever 319 and its associated mechanisms to a neutral position and, consequently, halt further movement of the table at rapid traverse rate. In a similar manner, rightward movement of the table 35 at rapid traverse rate will be halted whenever the rapid traverse stop dog 361 engages the tip of the plunger 353. When this occurs, the plunger is likewise depressed to actuate the control unit and effectively disconnect the rapid traverse motor 281. As shown in Fig. 2, the plunger rods 353 and 354 are disposed in different vertical planes to permit overtravel of one set of stop dogs into the actuating zone of the other plunger. Thus, the stop dog 360 can only engage the plunger 354 to halt leftwardly movement of the table at rapid traverse rate, while the dog 361 can only engage the plunger 353 to halt rightwardly movement of the table at rapid traverse rate. In any case, when one of the stop dogs 358, 359, 360 or 361 engages the plungers 353 or 354, the contact drum 317 is rotated to a neutral position wherein one of the motors 280 and 281 is disconnected from the supply lines. Further power movement of the table can be instituted by again manually shifting the control lever 319 to one of the four "driving" positions.

In certain types of operating cycles, it may be advisable to operate the table in a given direction at rapid traverse rate until the workpiece is brought up to the cutter and thereafter operate the table at feed rate while the cutter is operating upon the workpiece. In order to effect a change in rate of travel, such as from rapid traverse rate to feed rate, a pair of trip-dogs 363 and 364 are provided. These dogs may be selectively positioned in the T-slot 352 on the table 35 to engage the trip plungers 353 and 354 at a desired point of table travel. The rate dog 363 is designed to operate with the trip plunger 353 in the control mechanism 316 while the rate dog 364 is designed to operate with the trip plunger 354. A resiliently retained engaging trigger 365 mounted on each of the rate dogs 363 and 364 serves to engage the trip plungers to effectively depress one of them from the uppermost rapid traverse position to an intermediate feed rate position only during forward movement of the table. During the return cycle of table movement, the resilient mounting of the trigger 365 permits the latter to be momentarily swung out of the actuating position when the trip-dogs pass their respective plungers 353 and 354. Thereby, the position of the plungers is not changed during this portion of the table travel.

For effecting a change in rate from feed to rapid traverse, a second set of rate trip-dogs 367 and 368 is provided for selective mounting on the front of the table 35 as aforedescribed. These trip-dogs serve to elevate the respective trip plungers from the intermediate feed rate position to the uppermost rapid traverse rate position. Each of the dogs is provided with a resiliently retained engaging trigger 369 which serves to actuate the associated control plunger only during forward movement of the table and is rendered ineffective upon engagement with the plunger during return movement of the table to complete an operating cycle. As shown in Fig. 1, the trigger on the dog 367 is provided with a forwardly extending inclined lug 370 which is disposed to engage a similarly inclined lug 371 extending rearwardly from the back side of the plunger rod 353. The engagement of the two inclined surfaces forces the plunger 353 upwardly and, consequently, effects clockwise rotation of the contact drum 317. When this occurs, the rightwardly movement of the table 35 at feed rate would be stopped and immediately thereafter the rapid traverse motor 281 would be energized to continue such rightwardly movement at rapid traverse rate.

The rate dog 368 has a rearwardly extending lug 372 with an inclined engaging surface which is disposed to engage a similar lug 373 integrally formed on the top front side of the trip plunger 354, as viewed in Fig. 1.

When the inclined surface of the lugs meet at some predetermined point of table travel, the trip plunger 354 is forced upwardly from the feed rate position to the uppermost rapid traverse rate position. The upwardly axial movement of the plunger 354 will cause the contact drum 317 to be rotated counter-clockwise, whereby the electric circuit to the feed motor 280 will be interrupted and the circuit to the rapid traverse motor 281 will be completed. Thus, the leftwardly movement of the table 35 at feed rate will be stopped and immediately thereafter the leftwardly movement of the table will be continued at rapid traverse rate.

Figure 3:
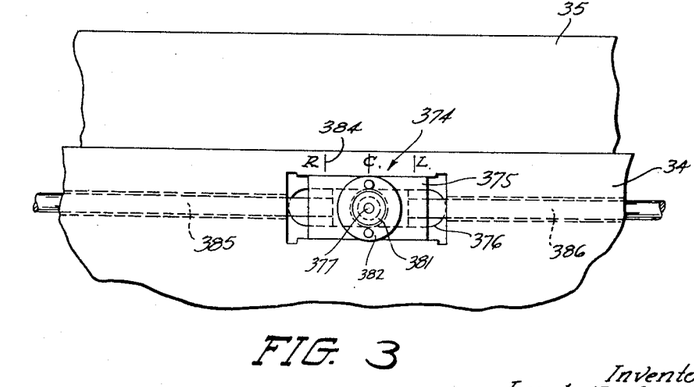
Fig. 3 is a fragmentary elevational view of the rear of the table and saddle showing the detent mounting constituting part of the control mechanism operably mounted in the saddle of the machine.

In order to effect an automatic reversal in direction of table travel, a selectively positionable detent mechanism 374 is disposed to effectively shift the clutch mechanism 312. As shown in Figs. 2 and 3, the detent mechanism 374 is adjustably mounted in the saddle 34. A frame 375 is disposed for horizontal movement in an elongated opening 376 in the saddle. The detent mechanism is carried in the frame 375 in a manner to present a detent plunger 377 slidably carried therein to the horizontal plane of operation of cam surface 378 formed on the extending end of a shifter fork 379 disposed to operate the clutch mechanism 312. The plunger 377 is retained in contact with the cam surface 378 by means of a spring 380 which abuts against the plunger and against a retaining sleeve 381 mounted in the frame 375 and locked in position by means of a lock nut 382. When the detent mechanism is centrally positioned in the saddle cavity, the tapered end of the detent plunger 377 will ride in a centrally disposed notched portion 383 of the cam surface 378 whenever the clutch 312 is retained in the neutral position.

If we assume an operating cycle in which the table is initially driven leftwardly at rapid traverse or feed rate and, thereafter, returned rightwardly to the starting position, the rapid traverse stop dog 360 will have been positioned predeterminately to engage the trip plunger rod 354 and force it downwardly to a neutral position, and thereby stop leftward table movement at a given point of travel. In setting up the operating cycle, the frame 375 supporting the detent plunger 377 must be positioned so that the axial center of the detent plunger 377 is shifted slightly to the left of the notched portion 383 of the cam 378. Just before the control mechanism is operated to effect reversal through engagement of the dog 360 with the trip plunger 354, the clutch teeth on the clutch mechanism 312 will have been meshed with the teeth on the side of the gear 308 to effect leftward movement of the table. As the dog forces the plunger 354 downwardly to shift the control mechanism to a neutral position, a linkage mechanism 321 operating the shifting fork 379 will function to shift the clutch 312 to the intermediate or neutral position between the two gears. However, at this instant the spring 380 supporting the detent plunger 377 will be compressed as the plunger is forced out of the notched portion 383 of the cam 378. The spring pressure will be sufficient to impart continued sidewise force to the shifter fork 379 and the clutch mechanism 312. Such additional movement of the clutch mechanism will bring the clutch teeth thereon into mesh with the clutch teeth on the gear 311 and, consequently, the drive train will be completed to effect rightwardly movement of the table at either feed or rapid traverse rate, depending upon the requirements of the operating cycle. After the table 35 has been returned to its initial starting point, a certain one of the stop dogs will serve to engage either of the plunger rods 353 or 354 to shift the control mechanism 316 to the neutral position, as aforedescribed, and halt further movement of the table. The detent mechanism 374 will not be rendered operable at this point of operating cycle when preset as described, because the action of the detent plunger is designed to aid only rightward movement of the clutch mechanism.

If we next assume an operating cycle wherein rightwardly table movement at either feed or rapid traverse rate is desired and with the return movement to the left, it is necessary to effect a reversal at the desired limit of rightward movement. With one of the stop dogs predeterminately set to engage one of the trip plungers in the control unit 316 and to actuate them to the neutral position when the table reaches this point of travel, the drive motors 280 and 281 will be deenergized and the shifter fork 379 will be actuated to move the clutch mechanism 312 to the central neutral position shown in Fig. 2. When this occurs, the rightwardly movement of the table is immediately stopped. In setting up the operating cycle for an automatic reversal at this point of travel, the operator will have positioned the detent mechanism 374 slightly to the right of the center line of the notched portion 383 on the cam surface 378 when the clutch 312 is in the neutral position, as viewed in Fig. 2. Appropriate indicia 384 is marked on the rear face of the frame 375 and on the adjoining face of the saddle 34 to aid the operator in setting the detent mechanism, as shown in Fig. 3. The movement of the detent frame 375 and the associated mechanism is effected manually by adjusting two screws 385 and 386 fixedly retained in each end of the frame 375 and disposed in bored passages within the saddle 34. The outer end of each of the screws 385 and 386 extends beyond the end of the saddle 34 and presents a threaded portion (not shown) upon which an adjusting nut (not shown) is mounted. Thus, the operator can effect endwise movement of the detent mechanism 374 in a horizontal plane in either direction by loosening one of the lock nuts and tightening the other until the indicia 384 signifies the desired position of the detent mechanism required for a given operating cycle.

When the detent mechanism 374 is shifted rightwardly to effect an automatic reversal of table travel from the right to the left, the tip of the detent plunger 377 will ride in the notched portion 383 of the cam surface on the fork 379, while it is positioned in engagement with the clutch teeth on the gear 311 to effect rightwardly movement of the table 35. When one of the stop dogs actuates the control mechanism 316 to a neutral position, the detent plunger 377 will be forced upwardly from the position shown in Fig. 2 to compress the spring 380 as the tip of the plunger leaves the notch 383 during the leftward movement of clutch 312 to the neutral position. As the tip of the plunger rides along the inclined surface on the right half of the cam 378, the spring pressure will be sufficient to impart additional impetus to the fork 379 and the clutch mechanism 312 operably associated therewith. Thus, the clutch mechanism 312 will be shifted beyond the central neutral position into mesh with clutch teeth on the gear 308 to complete the gear train for driving the table 35 leftwardly; thus, the return portion of the operating cycle is rendered operable. The table will continue to move leftwardly until a predeterminately positioned stop dog again actuates the control mechanism 316 to a neutral position, whereupon either of the drive motors 280 and 281 will be de-energized and the clutch 312 shifted to a neutral position to terminate the operating cycle. Succeeding automatic cycles can be initiated through the manual manipulation of the control lever 319, as aforedescribed.

An auxiliary set of stop dogs 388 and 389, as shown in Fig. 1, are adapted to actuate the control unit trip plungers 353 and 354 to a neutral position, in the same manner as the rapid traverse stop dogs 360 and 361. The stop dogs 388 and 389 can be used when the positioning of the trip dogs in the T-slot on the front of the table 35 is such that there is not sufficient room to use the standard type of rapid traverse stop dog, such as dogs 360 and 361. Such would be the case when the distance of the various operating cycles is very short, as might occur while milling comparatively small workpieces. The dog 388 is provided with a rearwardly extending lug 390, which is disposed to engage the lug on the depressed pluger rod 354, during rightwardly movement of the table 35. The auxiliary stop dog 389 is likewise provided with a lug 391 which extends forwardly to engage the depressed trip rod 353 during leftward movement of the table. Thus, it is evident that these dogs while serving to return the plungers 353 and 354 to a neutral position operate oppositely from the standard rapid traverse stop dogs 360 and 361 in that they engage the opposite plunger which is depressed during a given portion of the operating cycle and force the plunger upwardly to the neutral position.

While the automatic control mechanism incorporating the invention is shown and described as driving the work retaining table of a machine tool, it is possible to use the same feed and rapid traverse drives to power operate other movable members of the machine, such as the knee 32 and the saddle 34 of a knee type milling machine. It would also be possible to drive such additional members with individual feed and rapid traverse mechanisms, as aforedescribed, with a single control mechanism, such as the unit 316, serving to unify the control of several drive mechanisms.

A modified form of the invention is shown in Figs. 6, 7, 8 and 9, as incorporated in a bed type milling machine. This modification includes the basic principle of the invention in that separate drive motors are used to drive a work retaining member of the milling machine at rapid traverse and feed rates selectively. While this modification is shown adapted to a bed type milling machine, it should be remembered that the application thereof may be readily adapted to effect movement of a work or cutter retaining member on various other types of machine tools, including lathes, grinders and drill presses.

Figure 6:
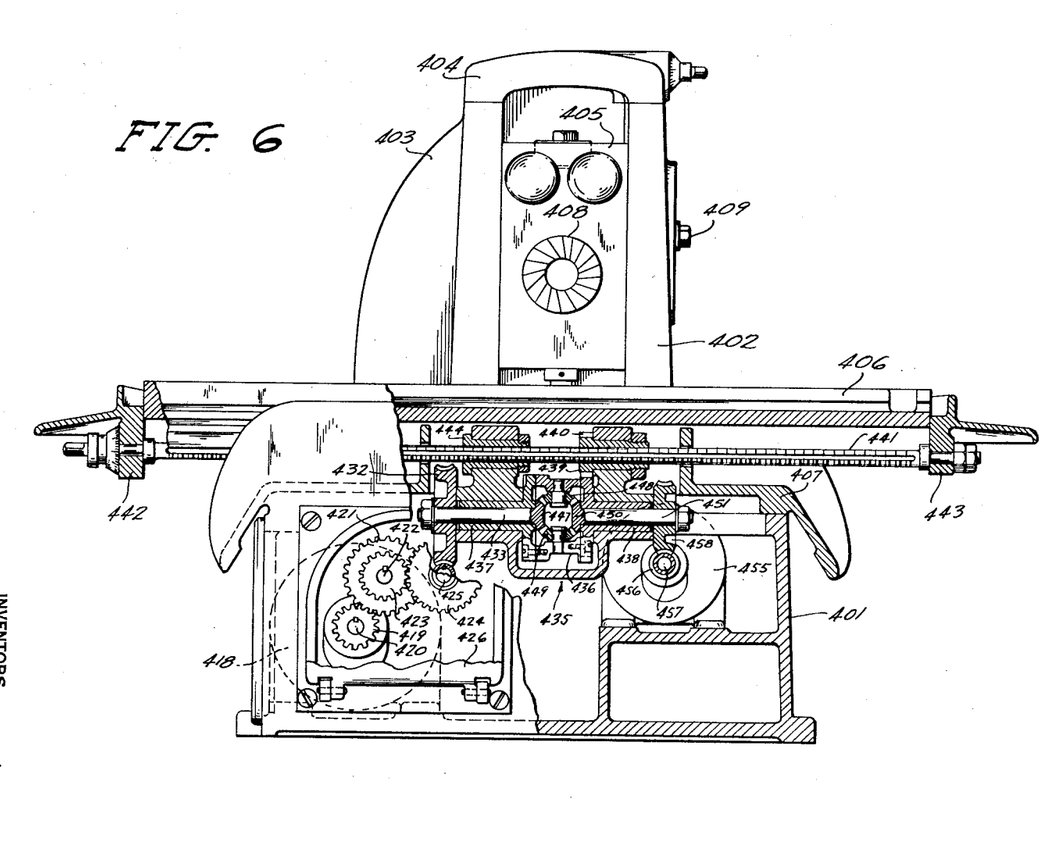
Fig. 6 is an elevational view of a bed type milling machine incorporating the principles of the invention.

As shown in Fig. 6, the bed type milling machine is comprised of several structural members, including a bed or base 401, a pair of uprights 402 and 403 slidably mounted on the base for horizontal movement and supported by a cross member 404 to present a cutter supporting spindle block 405 in operable relationship with a table 406; the latter is slidably mounted in a saddle 407 which is fixedly carried on the base. The table 406 is disposed to reciprocally present a workpiece (not shown) clamped thereon to a cutter 408 in a manner well known in milling machine practice. The spindle block 405 is slidably carried between the two upright supports 402 and 403 to permit a vertical adjustment of the spindle block assembly. In this manner, the relationship of the cutter to the workpiece can be readily adjusted in one of several planes. Thereafter, the spindle block assembly 405 is locked in position by means of a clamping mechanism contained within the block and uprights by tightening a bolt 409 associated therewith and extending from the side of the upright 402.

Figure 9:
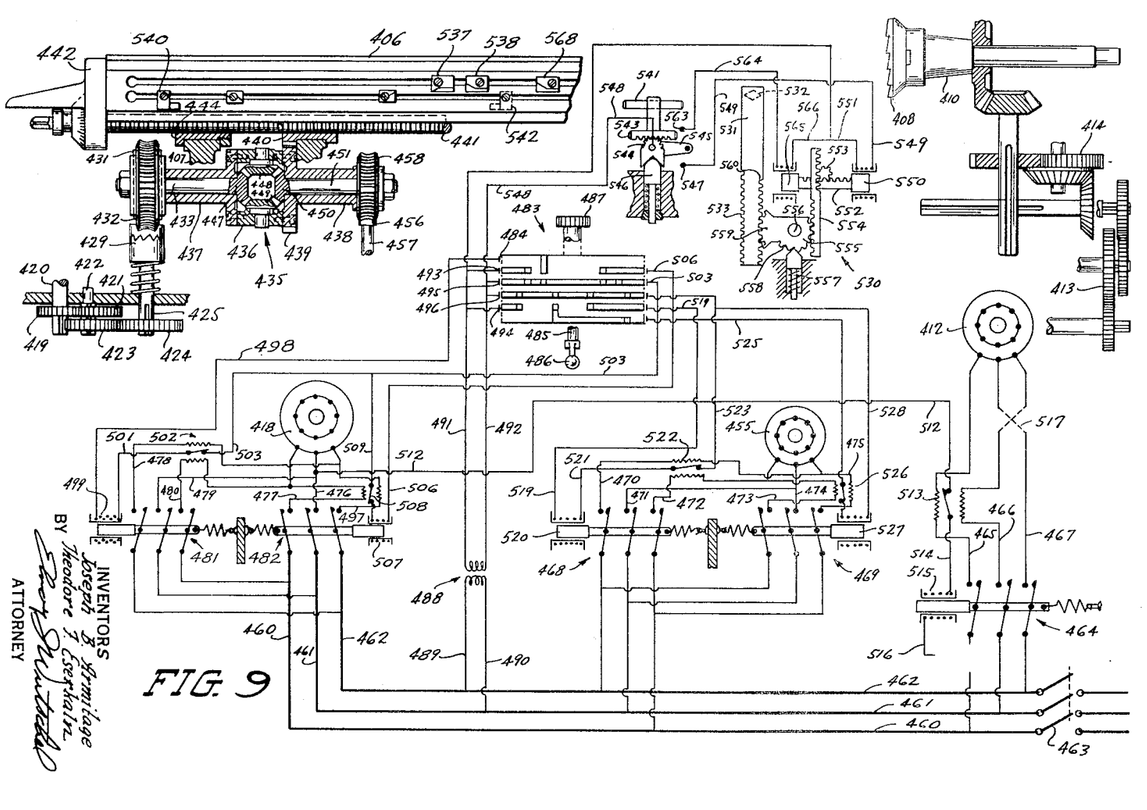

As diagrammatically shown in Fig. 9, the cutter 408, mounted in a spindle 410 journalled in the spindle block 405, is driven from a spindle motor 412 mounted within the bed 401. The motor is disposed to drive a pick-off gear transmission 413 which, in turn, drives various gearing 414 connecting with the spindle 410. The spindle is power driven at a desired speed regardless of the vertical position of the spindle block 405. A set of interchangeable pick-off gears is provided for use in the pick-off gear transmission 413 to permit the operator to selectively change the speed rate of the spindle 410 and cutter 408 in a well known manner. The usual mechanical reversing mechanism is not used because reversal of the spindle 410 is effected electrically by reversing the direction of rotation of the motor 412.

Referring to Figs. 6, 7, 8 and 9, the table 406 is selectively driven at one of a plurality of feed rates by a motor 418 mounted in an enclosed compartment within the bed 401. A pick-off gear 419 mounted on a motor armature shaft 420 is disposed to mesh with a second pick-off gear 421 mounted on an idler shaft 422. Another gear 423 mounted on the idler shaft meshes with a pick-off gear 424 interchangeably mounted on the end of shaft 425. All of the aforementioned gears are readily accessible through a hinged door 426 on the front of the bed 401. By interchanging the position of the gears on the various shafts or by substituting other gears in a well known manner, the shaft 425 connecting with the table feed drive mechanism may be driven at any one of a plurality of speeds.

An automatic spring loaded clutch mechnanism 429 is driven by the shaft 425 and serves to disconnect the driving train and protect the transmission gears and motor upon the occurrence of excessive torque in the table drive mechanism, such as might occur when the cutter is stalled while engaging the workpiece. The clutch mechanism 429 transmits power to a shaft 430 shown in Fig. 8, which is journalled within the bed 401. A worm 431 integrally formed on the end of the shaft meshes with a worm wheel 432 fixedly keyed on the end of a shaft 433.

A differential mechanism 435, as shown in Figs. 6 and 9, is operably mounted in the saddle 407. The differential mechanism 435 is similar to the differential mechanism 292 aforedescribed. The utilization of a differential makes it possible to unify the feed and rapid traverse drives into a single driving train to effect a power drive to the table 406. The differential includes a carrier 436 having a pair of sleeves 437 and 438 integrally formed therewith and journalled in the saddle 407. The carrier 436 has a gear 439 machined on its outer periphery which meshes with a gear 440 rotatably journalled in the saddle 407. The gear 440 is slidably keyed to a table screw 441 rotatably journalled in a pair of table brackets 442 and 443 fastened to the ends of work retaining table 406. Thus, selective rotation of the carrier gear 439 and the gear 440 is transmitted to the table screw shaft 441. Since the table screw is threadedly retained in a nut 444 anchored in the saddle 407, the rotation of the table screw 441 will cause the table 406 to move longitudinally upon the saddle 407.

The shaft 433 carrying the worm wheel 432 is journalled within the sleeve 437. A pinion gear 447, integrally formed on the end of the shaft 433, meshes with a pair of spider gears 448 and 449 each rotatably journalled within the carrier 436. Each of the spider gears 448 and 449 also meshes with a second pinion gear 450 on the end of a shaft 451 journalled in the carrier sleeve 438. Whenever the feed motor 418 is energized, the feed train is driven to effect rotation of the differential mechanism 435 at a selected speed and, consequently, the table 406 will be driven at a desired feed rate. A change in direction of travel of the table 406 is effected electrically by changing the direction of rotation of the feed motor 418. Thus, the usual mechanical reversing mechanism is eliminated from the table drive mechanism.

Figure 7:
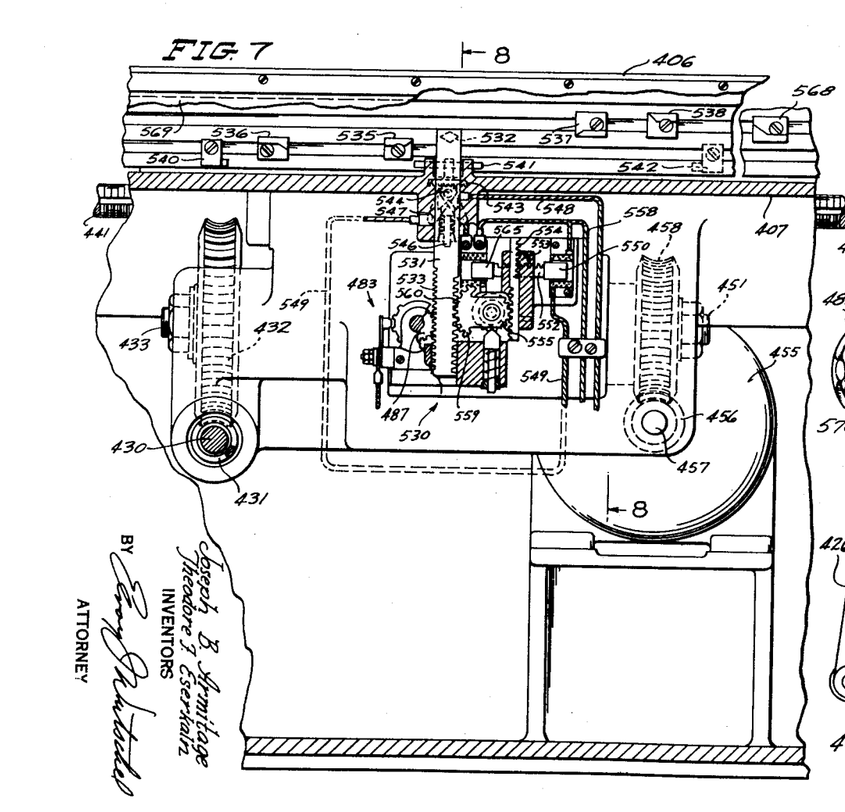
Fig. 7 is a vertical fragmentary sectional view of the front of the machine shown in Fig. 6 showing the automatic switch actuating mechanism.

The table 406 may also be power driven in either direction at rapid traverse rate through energization of a rapid traverse motor 455; as shown in Figs. 6 and 7, this motor is mounted within the bed 401. A worm 456 is keyed directly to the end of motor armature shaft 457. The worm 456 meshes with a worm wheel 458 fixedly carried on the end of the shaft 451. The energization of the rapid traverse motor 455 serves to effect rotation of the shaft 451 and gear 450 within the differential carrier 436 (see Figs. 6 and 9). The gear 439 on the periphery of the carrier will be driven at a fixed rapid traverse rate and, consequently, the table 406 will be driven at a rapid traverse rate. The electric control of the motors 418 and 455 is such that only one of the motors can be energized to drive the table 406 at a given instant. Thus, when the motor 455 is energized, the feed motor 418 is de-energized and, consequently, the gear 447, within the differential 435 driven by the feed motor, will not be rotating. When the rapid traverse motor 455 is energized to drive the pinion gear 450, the spider gears 448 and 449 meshing therewith will be driven at a fixed rapid traverse rate about the then stationary pinion gear 447, In this manner, a torque will be imparted to the differential carrier 436 to effect its rotation at the predetermined rapid traverse rate. A reversal in the direction of table travel at rapid traverse rate is electrically accomplished by reversing the direction of rotation of the rapid traverse motor 455.

Control of the three motors 412, 418 and 455 is effected electrically to produce a desired operating cycle. Either a continuous or intermittent operating cycle may be adapted by positioning a plurality of trip dogs on the front of the table 406, or a manual control of the motor operation is possible through the manipulation of control mechanism to be hereinafter more fully described. By setting up an automatic operating cycle, it is possible to effect movement of the table 406 for precise predetermined distances at either feed or rapid traverse rates, or any combinations thereof, and to effect reversal in the direction of movement at any preselected limits of travel.

The spindle drive motor 412, the feed motor 418, and the rapid traverse motor 455 are each energized from supply lines 460, 461 and 462, with the current to the lines controlled through a master switch 463. Upon closure of the master switch 463 current is supplied to each of the solenoid actuated motor starting switches. Thus, in the case of the spindle motor 412, current will flow to a spindle motor switch 464. Whenever this switch is closed, current will flow through the switch contacts to lines 465, 466 and 467 connecting with the spindle motor. Closure of the master switch 463 will likewise permit current flow to rapid traverse motor switches 468 and 469. These switches are electrically controlled so that only one or the other can be closed at a particular instant to energize the rapid traverse motor 455 for operation in a desired direction of rotation. When the rapid traverse motor switch 468 is closed, a circuit is completed from the supply lines 460, 461 and 462 through the switch to lines 470, 471 and 472 connecting with the rapid traverse motor 455 and effect its operation in one direction. Whereas, a closure of the rapid traverse motor switch 469 will complete a circuit from the supply lines 460, 461 and 462 through the switch and lines 473, 474 and 475 connecting with the motor 455 and energize it for operation in the opposite direction. The closure of the master switch 463 also makes the current available to the feed motor starting switches 481 and 482. Closure of switch 482 permits a current flow from the supply lines 460, 461 and 462 through the closed switch and lines 497, 476 and 477 to the feed motor 418. When the feed motor switch 481 is closed, the current will flow from the supply lines through the switch and the conductors 478, 479 and 480 to the feed motor. The hook-up is such that closure of the switch 481 will effect motor rotation in one direction while closure of the switch 482 will effect motor rotation in the opposite direction. The electrical operation of the feed motor switches 481 and 482 prevent the simultaneous closure of both switches.

An electric control system is provided to afford complete operating control of the three motors 412, 418 and 455. Power for driving the table 406 is provided by energizing either the feed rate motor 418 or the rapid traverse motor 455, whereas the direction of table travel is controlled by electrically reversing the said drive motors. The spindle motor 412 is connected into the control system in a manner to have the cutter 408 rotating whenever the work retaining table is being driven at feed rate through energization of the feed motor 418.

Figure 8:
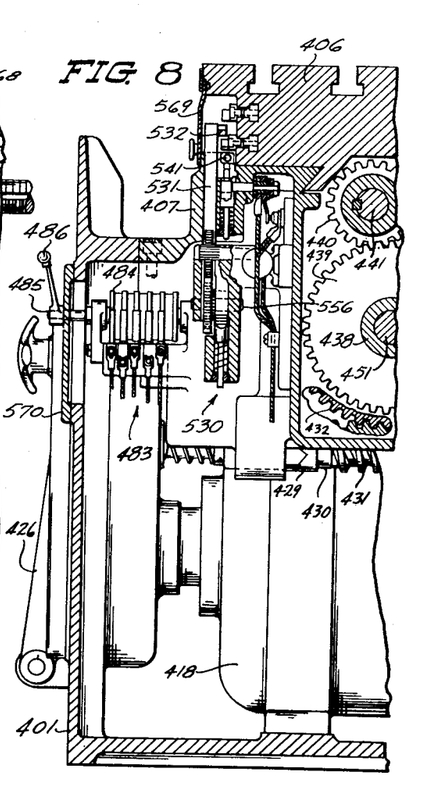
Fig. 8 is a vertical sectional view taken on the plane of the line 8—8 in Fig. 7 showing the mounting of the drum type control switch in relation to the trip mechanism; and, Fig. 9 is a schematic diagram of the mechanical drive trains and the electrical control circuit for the machine shown in Figs. 6, 7 and 8 and constituting a modified version of the invention.

Electric control of the motors is provided through the manual or automatic operation of a drum switch mechanism or control unit 483 mounted on the front of the saddle 407. This switch mechanism is similar in structure to the control unit 316 previously described in connection with the first modified version of the invention, and includes a drum 484 rotatably mounted on a shaft 485 journalled in the saddle 407. Manual rotation of the drum is effected through the manipulation of a control handle 486 mounted on the front of the machine, as shown in Fig. 8. The handle is fixedly attached to the outer end of the shaft 485, while a gear 487 is keyed to the other end of the shaft. Automatic operation of the drum switch 483 is effected by the operation of this gear, as will be hereinafter more fully described. As shown in Fig. 8, the drum 484 is made up of a nonconductive material having a plurality of conductor segments molded therein and presenting a plurality of contact surfaces on the peripheral face of the drum. These contact surfaces are predeterminately spaced to serve as electric conductors when the drum is selectively rotated to certain of the five positions. The contact surfaces are arranged in seven circumferential paths, as diagrammatically indicated in Fig. 9.

The low voltage control circuits, as set up by the operation of the drum switch 483, are energized from the supply lines 461 and 462 connected with a transformer 488 by means of conductors 489 and 490. The secondary winding of the transformer 488 is connected to conductors 491 and 492. The conductor 491 is disposed to supply current to a pair of brush terminals 493 and 494, while the conductor 492 is disposed to supply current to another pair of brush terminals 495 and 496. The drum 484 may be positioned so that none of the control circuits are energized since none of the brush terminals engage the contact surfaces on the face of the drum. When the switch is shifted to a second position, the current from the line 491 passes through the terminal 493 and the engaged drum contact segments to a line 498 connecting with a solenoid 499 operatively disposed to actuate the feed motor switch 481. The solenoid 499 is also connected to a line 501 which connects with a feed motor overload device 502, and which, in turn, is connected to a line 503. The line 503 connects with the drum switch 483, which is positioned to permit a current passage to the brush terminal 495 connecting with the transformer line 492 to complete the circuit. When the solenoid 499 is thus energized, the feed motor switch 481 is actuated to a closed position to energize feed motor 418 for rotation in a given direction. When thus energized, the feed motor will operate to drive the table 406 leftwardly at feed rate.

When the table 406 is to be driven rightwardly at feed rate, the drum switch mechanism 483 must be rotated to a third position. With the drum 484 thus positioned, the low voltage control current will flow from the line 491 through the switch to a line 506 which connects with one terminal of an actuating solenoid 507 operatively disposed to shift the feed motor starting switch 482 from an open to a closed position. The solenoid is serially connected with an overload device 508 which, in turn, is connected to a line 509 joining with the return line 503. Thus, control current from the solenoid 507 will flow to the overload device 508, the line 509, the line 503 and the drum switch 483 to the control circuit line 492. When the solenoid 507 is thus energized, the armature therein will operate to close the feed motor switch 482 and permit current flow from the supply lines 460, 461 and 462, to the feed motor 418. The feed motor will then be rotatively energized to cause the table 406 to move rightwardly at feed rate. The arrangement of the contact segments on the peripheral surface of the drum 484 is such that only one of the two feed motor switches 481 and 482 can be closed at a given time. Each of the switches is provided with resilient means to retain the switch in a normally opened position so that the switch will open to disconnect the motor 418 from the supply line, since any rotative movement of the drum 484 in the drum switch mechanism 483 will cause the switch actuating solenoids 499 and 507, respectively, to be de-energized.

Whenever the feed motor 418 is energized through the closure of either of the motor starting switches 481 and 482 the spindle motor 412 will also be energized. Consequently, the cutter 408 will be rotating whenever the table 406 is driven at feed rate. Supply line current flowing through the feed motor line 476 to the feed motor 418 is partially diverted through a line 512 connecting with an overload device 513 associated with the spindle motor 412. A conductor 514 connects the overload device with an actuating solenoid 515 operatively connected to the spindle motor starting switch 464. The solenoid is connected by line 516 with a spindle motor supply line joining with supply line 469. Thus, whenever the feed motor 418 is energized, the spindle motor starting switch 464 will be actuated to a closed position wherein the supply line current will energize the spindle motor 412. A manually operated reversing switch 517, connected in the spindle feed lines 466 and 467, permits the operator to reverse the direction of rotation of the spindle motor 412 and, consequently, to reverse the direction of rotation of the cutter 408 and spindle 410. With this arrangement, the operator may selectively position the reversing switch 517 for a particular cutter and the cutter will be driven in the selected direction regardless of the direction of rotation of the feed motor 418.

The table 406 may also be driven at rapid traverse rate in either direction. The drum switch mechanism 483 may be manipulated to cause the control current to flow through the contact segments on the drum 484 via the brush terminals 494 and 496 to actuate the rapid traverse motor starting switch 468. Thus, the control current from the line 491 will flow through the drum switch and a line 519 to an actuating solenoid 520 operative on the starting switch 468. Thereafter, the current will flow through line 521, a line 523 and the drum contact segment joining with the brush terminal 496 to the control circuit line 492. When the circuit is completed, the solenoid 520 will operate to close the switch 468 whereupon the supply line current will energize the rapid traverse motor 455 and cause the table 406 to be driven rightwardly at rapid traverse rate.

If the table is to be driven leftwardly at rapid traverse rate, the drum switch mechanism 483 must be manually or automatically actuated to rotate the drum 484 to another position. At this time, the control current from the line 491 will flow through brush terminal 494 and the contact segment in the drum to a line 525 joining with an overload device 526. This device, in turn, is connected to an actuating solenoid 527. Thereafter, the current will flow through a line 528 joining with the return line 523 and then through the drum switch to the control line 492. The energization of the coil in the solenoid 527 serves to actuate the armature therein and to operate the rapid traverse motor starting switch 469. The closure of this switch serves to energize the rapid traverse motor 455 and to provide power for driving the table 406 in a leftwardly direction. The drum control arrangement is such that only one of the rapid traverse motor starting switches 468 and 469 may be energized at a given instant. Each of the switches is resiliently retained in a normally open position and may be actuated to a closed position only upon the energization of its associated solenoid.

Automatic operation of the drum switch mechanism 483 is made possible by means of an automatic actuating mechanism 530, as shown in Figs. 7 and 8. This mechanism is disposed on the front of the machine and is operably mounted in the saddle 407. An actuating post 531 is slidably mounted for axial movement in the saddle. The upper end of the post extends above the saddle and has formed thereon a diamond shaped lug 532. The lug extends rearwardly from the back side of the post 531 and is disposed to be engaged by any one of a plurality of trip dogs mounted in a well known manner on the front face of the machine tool table 406. The tripping post 531 may be actuated to one of five positions depending upon the setting of the trip dogs. A gear rack 533 machined on the lower end of the post 531 is disposed to engage the teeth of the gear 487 keyed for unitary operation with the drum switch shaft 485. When the drum 484 is rotated to either position for effecting leftward movement of the table at a rapid traverse or feed rate, the tripping post 531 is lowered to one of two positions. If the table operating cycle is initially instituted by manually shifting the control lever 486 to one of the four power drive positions, an intermittent or continuous operating cycle may be instituted by mechanically shifting the position of the tripping post 531. This is accomplished through the engagement of the diamond-shaped lug 532 with certain trip dogs 535, 536, 537 and 538 predeterminately positioned and locked in T-slots on the front face of the table 406, as shown in Figs. 7, 8 and 9.

For example, if the table is moving rightwardly at feed rate, the trip dog 535 may be predeterminately positioned to engage the lug 532 on the tripping post and force it downwardly to the rapid traverse position. When this occurs, the tripping post is forced downwardly and the position of the drum switch mechanism will be changed whereupon the feed motor 418 will be de-energized and the rapid traverse motor 455 will be energized to effect rightwardly movement of the table at rapid traverse rate.

Later on in the operating cycle, the lug on the tripping post 531 may again be engaged by the trip dog 536. This dog is provided with a contact surface which is designed to engage the lug 532 while it is in the lowermost position and to force it upwardly. Thus, the engagement will effectively raise the tripping post 531 from the rapid traverse position to the feed rate position and cause the drum 484 and drum switch 483 to be rotated accordingly. Such rotation of the drum switch will serve to interrupt the electric control circuit momentarily to effectively disconnect the rapid traverse motor 455 and connect the feed motor 418 whereby the rapid traverse movement of the table 406 to the right will be stopped and feed rate movement of the table to the right will be instituted.

On the other hand, if the table is moving leftwardly at feed rate, the operating cycle may be predeterminately varied to bring the trip dog 537 into engagement with the lug 532 on the trip post at some point of table travel. When this occurs, the trip post 531 will be raised from the feed rate position to the uppermost rapid traverse position. As viewed in Fig. 7, the drum switch 483 will be rotated counter-clockwise to instantly interrupt the control circuit energizing the actuating solenoid 499 for the feed motor starting switch 481, and, consequently, stop leftwardly movement of the table at feed rate. Thereafter, the control circuit actuating the rapid traverse motor starting switch 469 will be completed and the rapid traverse motor 455 will be energized to effect leftwardly movement of the table 406 at rapid traverse rate.

Continued leftwardly movement of the table at rapid traverse rate may thereafter be halted and again changed to feed rate by predeterminately positioning the trip dog 538. In this case, the trip dog 538 serves to force the tripping post 531 downwardly from the uppermost rapid traverse position to the feed position whereupon the drum 484 in the drum switch 483 is rotated clockwise. Such rotation will serve to disconnect the rapid traverse motor 455 from the supply lines and thus stop leftwardly table movement at rapid traverse rate. Simultaneously, the control circuit disposed to effect energization of the feed motor 418 will be completed and leftwardly movement of the table will again proceed at feed rate.

Automatic reversal in the direction of table travel may be effected by means of the automatic actuating mechanism 530. Reversal during rightwardly movement of the table at either feed or rapid traverse rates is effected through the engagement of a reversing dog 540 with a horizontally disposed trip rod 541 centrally disposed on the saddle 407, as shown in Fig. 7, while reversal during leftwardly movement of the table is controlled through the engagement of a reversing dog 542 with the trip rod 541. Each of the reversing dogs 540 and 542 are selectively positioned in the lower T-slot on the front face of the table and, as shown in Fig. 8, are disposed to operate in a vertical plane different from that of the tripping post 531, in order to avoid any possible mistake in the operation of the various trip dogs. As shown in Figs. 7 and 9, the trip rod 541 is disposed for horizontal axial movement and is attached to a rack member 543. The rack member meshes with a gear segment 544 formed on the end of a switch contact arm 545 appropriately journalled on the saddle 407. A detent mechanism 546 is operatively disposed to retain the arm 545 and the trip rod 541 in a normal central position. However, if the trip rod 541 is engaged by either of the reversing trip dogs 540 and 542, the arm 545 will be shifted to one of two contact closing positions.

Thus, for example, if it is necessary to effect a reversal in the direction of table travel while the table 406 is moving rightwardly, the reversing dog 540 will be positioned to engage the trip rod 541 at a selected point of table travel. Such engagement will cause the rod 541 and the rack 543 associated therewith to move rightwardly and force the contact arm into engagement with a contact terminal 547. Since the contact arm includes an electric contact connected to control circuit supply line 548 which is also connected to the control circuit line 492, the low voltage current will flow through the arm and the contact terminal 547 to a line 549 joining with an actuating solenoid 550. The solenoid is connected to a return line 551 which joins with the other control circuit conductor 491 to complete the circuit. The energization of the solenoid 550 serves to shift a horizontally disposed rack member 552 rightwardly. The teeth on the rack 552 mesh with teeth on an elongated gear 553 appropriately journalled and effect its counter-clockwise rotation. The teeth of the gear 553 also mesh with a vertically disposed rack member 554 and, in the particular instance, will cause it to move downwardly. Teeth on the lower end of rack member 554 mesh with a gear segment 555. The gear segment is rotatably mounted on a shaft 556 and is retained in position by means of a resiliently operative detent mechanism 557 which engages a five-notch detent cam surface 558 thereon. As shown in Fig. 9, the detent plunger is disposed in the center notch wherein the tripping post 531 is retained in a neutral position through the engagement of a second gear segment 559 with a gear rack 560 machined on the lower end of the tripping post. However, when the solenoid 550 is energized, the rack members 552 and 554 operate to rotate the multiple gear segments 555 and 559 clockwise to raise the tripping post 531 to a position requiring leftwardly movement of the table at feed rate. Since the other rack teeth 533 on the tripping post are in engagement with the gear teeth 487, the drum switch mechanism 483 will be correspondingly operated to complete the necessary control circuits, whereby the feed motor 418 will be energized for effecting leftwardly movement of the table 406.

Reversal of the table movement may be effected while the table is moving leftwardly at either feed or rapid traverse rates through the engagement of the reversing dog 542 with the trip rod 541. When this occurs, the rod and its associated rack member 543 will be displaced leftwardly to rotate the gear segment 544 and contact arm 545 counter-clockwise from the neutral position shown in Fig. 9. The insulated contact on the end of the arm 545 will be moved into engagement with a contact terminal 563 which connects with a conductor 564. The conductor connects with a solenoid 565 which has an armature attached to the rack member 552. The solenoid is also connected to the return line 551 via a conductor 566. Consequently, the movement of the contact arm 545 will permit control current to flow from the conductor 492 and conductor 548 through the insulated contact arm and the terminal 563 to the solenoid 565 by the conductor 564. Thus, the solenoid will be energized to actuate the rack members 552 and 554 and cause the multiple gear segments 555 and 559 to rotate in a counter-clockwise direction. This rotation will lower the tripping post 531 from its previous position to a position calling for feed rate movement of the table to the right. Such axial movement of the post will effectively reposition the drum 484 in the drum control switch 483 to complete the necessary control circuits and to actuate the feed motor starting switch 482 and, consequently, effect the energization of the feed motor 418 wherein the table will be driven rightwardly at feed rate. Immediately after the rightward movement of the table has begun, the reversing dog 542 will move out of engagement with the trip rod 541 and the detent mechanism 546 will operate on the gear segment member 544 and rack 543 to return the tripping rod 541 to the central or neutral position shown in Figs. 7 and 9. However, the detent mechanism 557 operative on the multiple gear segments 555 and 559 will serve to retain the tripping post 531 in the position to which it was shifted to effect the rightwardly movement of the table at feed rate. The tripping post 531 will remain in this position until it is again engaged by one of the trip dogs or operated upon by the automatic actuating mechanism 530, as previously described.

A continuous operating cycle may be set up by using both of the reversing dogs 540 and 542 to effect reversal at the prescribed limits of rightwardly and leftwardly movement of the table. Or, an intermittent operating cycle may be set up by using just one of the reversing dogs and by using a stop dog 568 to automatically stop the cycle at a prescribed limit of travel. In either case, the operating cycle is initially started through the manual manipulation of the control lever 486 to one of the four positions calling for power movement of the table. Thereafter, the various trip dogs will take over the control of the operating cycle and will cause it to continue until such a time that the operator sees fit to stop the cycle by moving the control lever 486 to the neutral position, or when a stop dog 568 is positioned to engage the lug 532 on the tripping post 531 and move it to the neutral position. In either case, the drum control switch 483 will be rotated to the neutral or center position in which all of the brush terminals are out of contact with the contact segments on the face of the drum 484 and, consequently, none of the control circuits are completed. It will be apparent from this explanation that any number of combinations of operating cycles may be set up by selectively positioning various trip dogs to produce any cycle of table performance which may be necessary for a high speed production milling operation. After the trip dogs have been selectively positioned for a particular operating cycle, the exposed portion of the tripping post 531 and the trip rod 541 together with all of the trip dogs, are enclosed by means of a cover 569, shown in Fig. 8, attached to the table. A cover 570 removably secured to the front face of the bed 401 provides access to the drum switch mechanism 483 and the automatic actuating mechanism 530.

With either of the versions of the invention aforedescribed, a movable member or members of a machine tool may be power driven according to the dictates of any preselected operating cycle required for a particular cutting operation. The movable member controlled in this manner may be either of the work retaining type or the cutter retaining type. Each of the versions aforedescribed, may be subject to several modifications including the incorporation of mechanical and hydraulic controls.

Although the apparatus shown in the drawings has been described in considerable detail for the purpose of fully setting forth a machine tool embodying the invention, it is to be understood that the structure herein described is intended to be illustrative only and that the various novel features of the invention may be incorporated in other structural forms without departing from the spirit and scope of the invention, as defined in the subjoined claims.

The principles of the invention having now been fully explained in connection with the foregoing description of an illustrative preferred embodying structure, we hereby claim as our invention:

1. In a control system for a machine tool having a base with a movable element slidably mounted thereon, a tool retaining spindle operatively disposed on the base relative to the movable element to perform a machining operation upon a workpiece carried by the movable element, a transmission mounted in the base, a reversing mechanism operably connected to transmit power from said transmission to the movable element for driving the movable element in its path of travel, said reversing mechanism being adjustable to determine the direction of travel of the movable element for driving the movable element in either direction and being also adjustable to a neutral position for interrupting the power train from said transmission to the movable element, a rapid traverse motor operatively connected to said transmission to furnish power for driving the movable element at a rapid rate of travel, a feed motor operatively connected to said transmission to furnish power for driving the movable element at a feed rate, a drum rotatably supported on the base, a linkage operably connected to said drum and to said reversing mechanism for adjusting said reversing mechanism in either direction from its neutral position in response to the direction of rotation of said drum in either direction from a neutral position for driving the movable element in either direction, a set of stationary contacts supported adjacent to said drum, a source of electrical energy connected to said set of stationary contacts, a plurality of rapid traverse contacts supported adjacent to said drum, a plurality of feed contacts supported adjacent to said drum, a plurality of electrical conducting contact strips fixed to the periphery of said drum to rotate with it in position to be moved by the rotation of said drum into engagement with said stationary contacts as well as with said rapid traverse and feed contacts selectively for electrically connecting said set of stationary contacts to said rapid traverse contacts and said feed contacts selectively by varying the rotary position of said drum in either direction from its neutral position, and an electrical circuit connecting said feed contacts to said feed motor and said rapid traverse contacts to said rapid traverse motor, whereby said drum may be rotated in either direction from its neutral position to establish the direction of movement of the movable element while selectively positioning said contact strips for completing an electrical circuit from said source of electrical energy to said rapid traverse motor and said feed motor selectively so that the rate and direction of travel of the movable element may be selected by varying the rotary position of said drum.

2. In a control system for a machine tool having a base with a movable element slidably mounted thereon, a tool retaining spindle operatively disposed on the base relative to the movable element to perform a machining operation upon a workpiece carried by the movable element, a transmission mounted in the base, a reversing mechanism operably connected to transmit power from said transmission to the movable element for driving the movable element in its path of travel, said reversing mechanism being adjustable to determine the direction of travel of the movable element for driving the movable element in either direction and being also adjustable to a neutral position for interrupting the power train from said transmission to the movable element, a rapid traverse motor operatively connected to said transmission to furnish power for driving the movable element at a rapid rate of travel, a feed motor operatively connected to said transmission to furnish power for driving the movable element at a feed rate, a drum rotatably supported on the base, a linkage operatively connected to said drum and to said reversing mechanism for adjusting said reversing mechanism in either direction from its neutral position in response to the direction of rotation of said drum in either direction from a neutral position for driving the movable element in either direction, a set of stationary contacts supported adjacent to said drum, a source of electrical energy connected to said set of stationary contacts, a plurality of rapid traverse contacts supported adjacent to said drum, a plurality of feed contacts supported adjacent to said drum, a plurality of electrical conducting contact strips fixed to the periphery of said drum to rotate with it in position to be moved by the rotation of said drum into engagement with said stationary contacts as well as with said rapid traverse and feed contacts selectively for electrically connecting said set of stationary contacts to said rapid traverse contacts and said feed contacts selectively by varying the rotary position of said drum in either direction from its neutral position, an electrical circuit connecting said feed contacts to said feed motor and said rapid traverse contacts to said rapid traverse motor, a tripping mechanism supported by the base and connected to said drum to effect the rotary movement of said drum when actuated, rate trip dogs adjustably secured to the movable element and operable to actuate said tripping mechanism when brought into engagement therewith by the movement of the movable element, said rate trip dogs being operable to actuate said tripping mechanism to effect the rotary movement of said drum for shifting said contact strips to change the electrical connections between said contacts and thereby vary the rate of travel of the movable element, reversing trip dogs adjustably secured to the movable element and operable to actuate said tripping mechanism when brought into engagement therewith by the movement of the movable element to cause rotation of said drum to its neutral position and thereby shift said reversing mechanism to its neutral position for terminating the movement of the movable element, and a detent mechanism carried by the base and operably connected to cooperate with said reversing trip dogs for shifting said reversing mechanism and rotating said drum from their neutral positions as established by said reversing trip dogs to an operating position for connecting one of said motors to drive the movable element in the direction opposite to the direction it was traveling when said reversing trip dogs actuated said tripping mechanism, whereby said drum may be rotated either manually or automatically by said trip dogs for establishing the direction and rate of travel of the movable element.

3. In a control system for a machine tool having a base with a movable element slidably mounted thereon, a transmission mounted in the base, mechanical reversing means operably connected to transmit power from said transmission to the movable element for driving the movable element in its path of travel, said mechanical reversing means being adjustable to determine the direction of travel of the movable element for driving the movable element in either direction and being also adjustable to a neutral position for interrupting the power train from said transmission to the movable element, a rapid traverse motor operably connected to said transmission to furnish power for driving the movable element at a rapid rate of travel, a feed motor operably connected to said transmission to furnish power for driving the movable element at a relatively slower feed rate, a drum supported on the base for rotation in either direction from a neutral position, a mechanical linkage operably connected to said reversing means and to said drum to be actuated by the rotary movement of said drum so that rotation of said drum in one direction from its neutral position will actuate said linkage to adjust said reversing means for establishing one direction of movement of said movable element and rotation of said drum in the opposite direction from its neutral position will actuate said linkage to adjust said reversing means for establishing the opposite direction of movement of said movable element, switching means on said drum operably connected to be closed and opened selectively by the rotary movement of said drum, a source of electrical energy connected to switching means, and an electrical circuit interconnecting said switching means to said rapid traverse motor and said feed motor for selectively energizing said motors by the selective operation of said switching means in response to the rotary position of said drum with said switching means being operable to effect the individual energization of either of said motors upon the rotation of said drum in either direction from its neutral position so that the movable element may be actuated in either direction at a rapid traverse rate and at a feed rate selectively, whereby said drum may be rotated in either direction from a neutral position for completing an electrical circuit from said source of electrical energy to said rapid traverse motor and said feed motor selectively and the rate of travel of the movable element will be established by the rotary position of said drum while the direction of travel of the movable element will be established by the direction of rotation of said drum from its neutral position.

4. In a control system for a machine tool having a base with a movable element slidably mounted thereon, a transmission mounted in the base, mechanical reversing means operably connected to transmit power from said transmission to the movable element for driving the movable element in its path of travel, said mechanical reversing means being adjustable to control the direction of travel of the movable element for driving the movable element in either direction and being also adjustable to a neutral position for interrupting the power train from said transmission to the movable element, a rapid traverse motor operably connected to said transmission to furnish power for driving the movable element at a rapid rate of travel, a feed motor operably connected to said transmission to furnish power for driving the movable element at a relatively slower feed rate, a drum supported on the base for rotation in either direction from a neutral position, a mechanical linkage operably connected to said reversing means and to said drum to be actuated by the rotary movement of said drum so that rotation of said drum in one direction from its neutral position will actuate said linkage to adjust said reversing means for establishing one direction of movement of said movable element and rotation of said drum in the opposite direction from its neutral position will actuate said linkage to adjust said reversing means for establishing the opposite direction of movement of said movable element, switching means on said drum operably connected to be closed and opened selectively by the rotary movement of said drum, a source of electrical energy connected to said switching means, an electrical circuit interconnecting said switching means to said rapid traverse motor and said feed motor for selectively energizing said motors by the selective operation of said switching means in response to the rotary position of said drum with said switching means being operable to effect the individual energization of either of said motors upon the rotation of said drum in either direction from its neutral position so that the movable element may be actuated in either direction at a rapid traverse rate and at a feed rate selectively, a pair of plungers slidably supported by the base for axial movement with one plunger being located on each side of said drum and each being in driving engagement with said drum so that the axial movement of said plungers will effect a rotary movement of said drum, a plurality of trip dogs adjustably secured to the movable element in position to be moved into engagement with said plungers individually by the movement of the movable element to actuate said plungers in their axial movement for rotating said drum to a predetermined rotary position for establishing the desired control of the movement of the movable element, and detent means carried by the base and operably connected to cooperate with said trip dogs for reversing the direction of movement of the movable element by rotating said drum from its neutral position to effect an adjustment of said reversing means from its neutral position as established by said trip dogs to an operating position for connecting one of said motors to drive the movable element in the direction opposite to the direction it was traveling when said trip dogs actuated said plungers, whereby said drum may be rotated either manually or automatically by said trip dogs for establishing the direction and rate of travel of the movable element.

References Cited in the file of this patent

UNITED STATES PATENTS

| | | |
|---|---|---|
| 760,577 | Sprong | May 24, 1904 |
| 1,397,731 | Goetz et al. | Nov. 22, 1921 |
| 1,821,514 | Hintz | Sept. 1, 1931 |
| 1,871,696 | Jackson | Aug. 16, 1932 |
| 1,931,171 | Sundstrand | Oct. 17, 1933 |
| 1,938,779 | Nenninger | Dec. 12, 1933 |
| 2,029,335 | Oberhoffken et al. | Feb. 4, 1936 |
| 2,082,140 | Bennett et al. | June 1, 1937 |
| 2,155,864 | Krause | Apr. 25, 1939 |
| 2,203,298 | Granberg | June 4, 1940 |
| 2,398,346 | Anderson | Apr. 16, 1946 |
| 2,465,720 | Flamm | Mar. 29, 1949 |
| 2,588,914 | Dunham | Mar. 11, 1952 |
| 2,653,519 | Armitage et al. | Sept. 29, 1953 |
| 2,681,393 | Hopkins | June 15, 1954 |